US011428706B2

(12) United States Patent
Golling et al.

(10) Patent No.: US 11,428,706 B2
(45) Date of Patent: Aug. 30, 2022

(54) SENSOR DEVICE

(71) Applicant: K.W.H. Ciclosport Vertriebs GmbH, Gräfelfing (DE)

(72) Inventors: Guido Golling, Kreuth (DE); Andreas Hochschorner, Gräfelfing (DE)

(73) Assignee: K.W.H. Ciclosport Vertriebs GmbH, Gräfelfing (DE)

( * ) Notice: Subject to any disclaimer, the term of this patent is extended or adjusted under 35 U.S.C. 154(b) by 7 days.

(21) Appl. No.: 17/073,872

(22) Filed: Oct. 19, 2020

(65) Prior Publication Data

US 2021/0123939 A1 Apr. 29, 2021

(30) Foreign Application Priority Data

Oct. 28, 2019 (DE) ...................... 20 2019 004 415.9

(51) Int. Cl.
*G01P 3/48* (2006.01)
*G01P 3/54* (2006.01)
*G01C 22/00* (2006.01)
*G01P 1/02* (2006.01)
*B62J 45/40* (2020.01)

(52) U.S. Cl.
CPC .............. *G01P 3/54* (2013.01); *G01C 22/002* (2013.01); *G01P 1/026* (2013.01); *B62J 45/40* (2020.02)

(58) Field of Classification Search
CPC ......... G01D 11/245; G01D 11/30; G01P 3/54; G01P 1/026; G01C 22/002; H05K 3/284; H05K 5/06; H05K 5/0217
See application file for complete search history.

(56) References Cited

U.S. PATENT DOCUMENTS

| 3,806,907 A | * | 4/1974 | Bound | G08B 13/10 |
| | | | | 340/566 |
| 5,438,869 A | | 8/1995 | Mueller et al. | |
| 5,637,995 A | * | 6/1997 | Izawa | G01D 5/145 |
| | | | | 324/174 |
| 6,064,200 A | * | 5/2000 | Saito | G01P 1/026 |
| | | | | 324/207.25 |
| 6,326,779 B1 | * | 12/2001 | Shinjo | G01R 33/09 |
| | | | | 324/207.21 |

(Continued)

FOREIGN PATENT DOCUMENTS

| FR | 2786572 A1 | 6/2000 |
| JP | 2018186608 A | 11/2018 |

OTHER PUBLICATIONS

European Search Report regarding Application No. 20197537.2, dated Mar. 16, 2021.

*Primary Examiner* — Thang X Le
(74) *Attorney, Agent, or Firm* — Harness, Dickey & Pierce, P.L.C.

(57) ABSTRACT

The invention relates to a sensor device with a beaker-like sensor housing and a wired sensor, wherein the beaker-like sensor housing has an introduction region for insertion of the wired sensor, an orientation region for orientating the wired sensor, and a placement region for final placement and securing of the wired sensor close to an end face of the sensor. The orientation region has an internal cross-sectional contour which is adapted to the cross-sectional contour of the sensor, and the sensor is introduced into a curable material in its placement region in the sensor housing to fixedly secure the sensor in the placement region against movement.

19 Claims, 2 Drawing Sheets

(56) References Cited

U.S. PATENT DOCUMENTS

| | | | | |
|---|---|---|---|---|
| 7,372,258 B2* | 5/2008 | Okui | ............... | G01P 1/026 |
| | | | | 324/207.25 |
| 8,006,555 B2* | 8/2011 | Tokuhara | ............. | G01D 11/245 |
| | | | | 73/431 |
| 8,770,988 B2* | 7/2014 | Furukawa | .......... | H01R 13/6658 |
| | | | | 439/76.1 |
| 2003/0002241 A1* | 1/2003 | Neuhaeuser | ............. | H05K 5/06 |
| | | | | 361/679.01 |
| 2005/0126308 A1* | 6/2005 | Tsuge | ............... | G01P 3/488 |
| | | | | 73/862.322 |
| 2007/0182403 A1* | 8/2007 | von Hayn | ............. | B60T 8/4872 |
| | | | | 324/207.24 |
| 2010/0298738 A1* | 11/2010 | Felts | ............... | B05D 5/08 |
| | | | | 118/712 |
| 2017/0329356 A1* | 11/2017 | McKeon | ............... | G01L 9/0002 |

* cited by examiner

SENSOR DEVICE

CROSS REFERENCE TO RELATED APPLICATION

This application claims the benefit and priority of German Utility Model No. 20 2019 004 415.9, filed Oct. 28 2019. The entire disclosure of the above application is incorporated herein by reference.

FIELD

The invention relates to a sensor device with a beaker-like sensor housing and a wired sensor, wherein the beaker-like sensor housing has an introduction region for the wired sensor and also an orientation region for the sensor and a placement region of the sensor close to an end face of the sensor housing.

BACKGROUND

Sensor devices of this type are used above all on wheels or bikes in order to detect the distances covered, speeds and further parameters of the bike, for example by way of magnetic pulses.

With the known sensor devices mentioned above, problems of precise arrangement on the frame of a bike can occur, as well as inaccuracies in the measurement detection, which originate from the sensor and its sensor housing, since they are not designed sufficiently robustly for various cycling purposes.

In particular, an inaccuracy in the measurement data may result from the actual sensor not being arranged reliably securely and precisely in the sensor housing, and, owing to the action of impact forces, undergoing changes in position which ultimately lead to measuring inaccuracies.

The sensor device itself should also be able to be arranged simply and precisely on the frame of a bike.

Taking these disadvantages into account, the object is therefore to design a sensor device of the generic type such that the measuring accuracy of the sensor device is maintained even in the case of externally acting forces such as vibrations or impact forces.

SUMMARY

This object is achieved by the features of the claimed subject matter.

One essential core concept in such case is to be able to very accurately introduce the wired sensor into the sensor housing and arrange it therein, with the arrangement of the sensor in the sensor housing being maintained even in the event of different applications of force. This ensures that the measuring accuracy of the sensor, once positioned in the housing of the device, is not impaired, even in the event of sudden applications of force.

On one hand, the design that the sensor, upon introduction into a beaker-like sensor housing, has to be guided through an internal cross-sectional contour of the orientation region, and the sensor itself has a corresponding cross-sectional contour which is adapted to the internal cross-sectional contour of the orientation region. This contributes to the high measuring accuracy. The corresponding orientation of the sensor upon introduction up to the placement region close to the inside of an end face of the sensor housing, and the embedding in a cured material, therefore yield a fixed position of the sensor in the sensor housing.

The introduction of the sensor into the sensor housing takes place in such case into the curable material introduced in the interior of the sensor housing, in particular a free-flowing plastics material or resin, with the curable material being cured by temperature or by radiation once the sensor has been placed in the region of an inner face of the end face of the sensor housing.

In the introduction region of the sensor housing, elongate guide bars are provided, which are preferably distributed over the inner periphery of the sensor housing. By means of the guide bars, the sensor can be introduced axially and centrally into the orientation region of the sensor housing, in order there, because of the adapted contours, to achieve its orientation which is necessary for the high measuring accuracy, for example in a particular angular arrangement.

In particular, four guide bars provided at the same angular distance from each other are provided in the introduction region for this.

Upon introducing the sensor which is connected to a cable into the inner region of the sensor housing, a tapering cross-section is provided after the introduction region on the orientation region or in front of the orientation region, so that the sensor can be inserted even more simply and accurately into the orientation region, which may in particular have a cross-section in the form of an oval.

After this orientation operation, the sensor with the cable is guided on through the free-flowing, curable material into its proper placement region close to the inside of the end face of the sensor housing.

This manufacturing operation expediently takes place with a vertical arrangement of the beaker-like sensor housing with an upward-pointing opening and at the bottom an end face which is closed in the base region.

One improvement is achieved in the case of the sensor device in that a strain relief means is arranged on the cable which is connected to the sensor. This may be done in a simple manner by arranging an O-ring on the cable. In such case, it is preferred for the opening of the O-ring to produce a press fit on the cable sheath, in order to absorb forces acting on the cable from the outside and to transmit them to the entire sensor housing. The O-ring is therefore preferably fixed in a ring groove on the introduction region of the sensor housing. Expediently, the fixing of the O-ring takes place after the curing of the material introduced in the interior of the sensor housing.

The possibility of strain relief by an O-ring fixed to the sensor housing also has the advantage that this different strain relief can also be realised with different openings of O-rings. The closure by means of an O-ring also aesthetically covers over the filled and cured material.

The sensor housing is preferably produced from a plastics material. In particular the plastics material having the brand name LEXAN® is suitable for this purpose.

Expediently, a Reed contact is used as sensor or sensor element, which contact can be closed or opened by the influence of magnetic fields. With regard to good detectability of a magnetic field which occurs in the vicinity of the outer end face of the beaker-like sensor housing, the sensor is placed very close to the inner end-face region of the sensor housing.

The free-flowing plastics material or resin, which has been introduced in an air-free and bubble-free manner into the interior of the sensor housing, therefore, once the material has been cured, ensures that an accurate arrangement of the sensor in the sensor housing is maintained.

A somewhat altered production method may also take into account that the wired sensor is introduced and placed into the beaker-like sensor housing prior to the introduction of the free-flowing material, and only subsequently is the free-flowing embedding material introduced into the interior of the beaker-like sensor housing.

BRIEF DESCRIPTION OF DRAWINGS

The invention will be discussed in greater detail below with reference to two schematic drawings, in which.

DETAILED DESCRIPTION

The sensor device according to the invention is shown schematically and discussed in greater detail below with reference to two schematic representations of the essential module, namely a sensor housing 1, without the actual sensor or the sensor element and without a corresponding cable connection.

Figure 1:
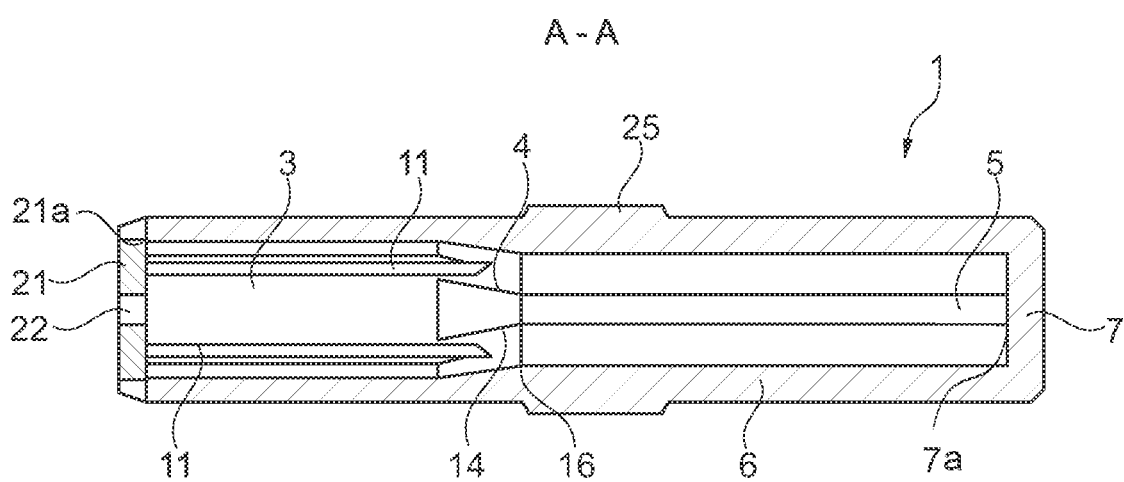
FIG. 1 is a longitudinal section through a sensor housing, without the sensor and cable but with strain relief provided on the end.

The longitudinal section of FIG. 1 through a beaker-like sensor housing 1 shows a beaker of the sensor housing 1 which is produced in particular in one piece from a plastics material, such as a polycarbonate resin thermoplastic available under the registered trademark "LEXAN"®. The left-hand end region of the sensor housing 1 shows an opening, into which an O-ring 21 is inserted and fixed. The sensor housing 1 is closed in the manner of a beaker by an end face 7 on the right end of the beaker-like housing 1 having a beaker 6 as shown in FIG. 1.

Figure 2:
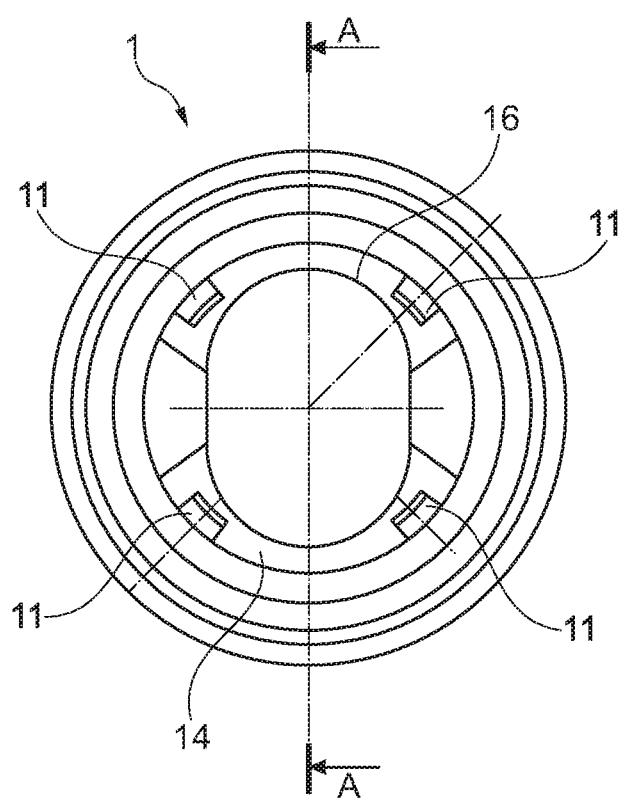
FIG. 2 somewhat enlarged, is a vertical section through a sensor housing as illustrated in FIG. 1 without strain relief on the end, viewed from the left; and wherein the schematic section according to FIG. 1 is marked A-A in FIG. 2.

In the production operation for the sensor device, the sensor housing 1 is usually arranged with its left-hand-side opening upwards in a vertical position. Then a curable, free-flowing material or a resin is introduced into the beaker 6 of the beaker-like sensor housing 1. Subsequently, the actual sensor (not shown in FIG. 1) with its connected cable is inserted into the upper opening of the beaker 6 and is guided or lowered centrally from an introduction region 3 into an orientation region 4 by means of a plurality of guide rails 11. The sensor is oriented by means of an internal contour, which is configured as an oval 16 (also visible in FIG. 2), by way of a conical tapered region 14 (also visible in FIG. 2).

The sensor or the sensor element in the example illustrated likewise has the external form of the corresponding oval 16, so that the sensor can be guided with an exact fit into the right-hand region of the sensor housing 1, which forms a lower placement region 5, through the oval 16.

Once the end position of the sensor in the region of an inner face 7a of the end face 7 has been reached, subsequently the curing operation of the curable material is carried out, it being possible to realise air-free and bubble-free embedding and fixing of the sensor in the sensor housing 1.

An O-ring 21 in this embodiment is attached to the cable for strain relief of the sensor. The O-ring 21 can be fixed in a ring groove 21a on an opening side of the introduction region 3 once the free-flowing material has been cured, and possibly also prior to curing. Thus, a closure is thereby provided also with respect to the embedding and encapsulation material.

In this design, the sensor device represents a very accurately arranged sensor, which is not adversely affected in its relative positioning in the interior of the sensor housing 1, even by acting impact forces, and thus also ensures high measuring accuracy.

An annular bead 25 in a middle region of the sensor housing 1 may also serve for accurate positioning of the sensor housing 1 on the frame of a bike, with clamping holders performing the further fastening to the frame of a bike on one side or on both sides of the annular bead 25.

The invention claimed is:

1. A sensor device comprising:
a beaker-like sensor housing configured for receiving a wired sensor;
the beaker-like sensor housing forming a single piece housing having:
an end face at one terminal end thereof;
an introduction region for the wired sensor at an end opposite the one terminal end;
an orientation region for the wired sensor which is adjacent to the introduction region and shaped with a contour in accordance with a cross-sectional contour of the wired sensor; and
a placement region adjacent to the orientation region for the wired sensor, the placement region being adjacent to the end face of the beaker-like sensor housing and in communication with the orientation region, and having a uniform cross-sectional configuration over its length;
wherein:
the orientation region has a narrowing, tapering cross-section portion forming a conical tapered region terminating in an opening of a predetermined cross-sectional shape, the predetermined cross-sectional shape being in accordance with a cross-sectional contour of the wired sensor, and the opening forming an entry point to the placement region;
the wired sensor in the beaker-like sensor housing is introduced into a curable material in the placement region; and
the curable material is cured to embed the wired sensor in the placement region.

2. The sensor device according to claim 1, further including a strain relief means for a wired cable portion of the wired sensor.

3. The sensor device of claim 2, wherein:
the strain relief comprises an O-ring element; and
the beaker-like sensor housing comprises a ring groove on an opening side of the introduction region for receiving and maintaining the O-ring element therein.

4. The sensor device of claim 2, wherein the introduction region of the beaker-like sensor housing includes a cable-adapted opening.

5. The sensor device according to claim 1, further including a plurality of guide bars for assisting in guiding insertion of the wired sensor into the orientation region of the beaker-like sensor housing.

6. The sensor device of claim 5, wherein the plurality of guide bars comprises four guide bars arranged at the same angular distance from each other in the introduction region of the beaker-like sensor housing.

7. The sensor device of claim 5, wherein each one of the plurality of guide bars extends along a full length of the introduction region.

8. The sensor device of claim 5, wherein at least one of the plurality of guide bars extends partially into the orientation region.

9. The sensor device of claim 5, wherein each one of the plurality of guide bars are all configured to extend parallel to one another.

10. The sensor of claim 9, wherein the narrowing, tapering cross-section portion is provided in front of or on the orientation region of the beaker-like housing.

11. The sensor device according to claim 1, wherein the sensor is adapted to be introduced into the curable material while the curable material is in a flowable state.

12. The sensor device according to claim 1, wherein the curable material comprises at least one of a free-flowing plastics material or a resin.

13. The sensor device according to claim 1, wherein the beaker-like sensor housing comprises a plastics material.

14. The sensor device of claim 13, wherein the plastics material comprises a polycarbonate resin thermoplastic.

15. The sensor device according to claim 1, wherein the orientation region has a cross-section in the form of an oval.

16. The sensor device according to claim 1, wherein the end face forms a detection zone of the wired sensor, at which the wired sensor produces a magnetic signal detectable by a Reed contact disposed adjacent the end face.

17. A sensor device comprising:
a beaker-like sensor housing configured for receiving a wired sensor;
the beaker-like sensor housing having:
an end face at one terminal end thereof;
an introduction region for the wired sensor at an end opposite the one terminal end;
an orientation region for the wired sensor which is adjacent to the introduction region and shaped with a contour in accordance with a cross-section contour of the wired sensor; and
a plurality of elongated guide bars formed in the introduction region and extending parallel to one another through a full length of the introduction region to the orientation region, and evenly circumferentially spaced from one another to extend radially partially into the introduction region, the plurality of elongated guide bars configured to aid in inserting the wired sensor through the introduction region into the orientation region;
a placement region adjacent to the orientation region for the wired sensor, the placement region being adjacent to the end face of the beaker-like sensor housing;
wherein:
the orientation region has an internal cross-sectional contour which is adapted to a cross-sectional contour of the wired sensor;
the wired sensor in the wired sensor housing is introduced into a curable material in its placement region; and
the curable material is cured to embed the wired sensor in the placement region.

18. The sensor device of claim 17, further comprising:
a strain relief means for a wired cable portion of the wired sensor;
the strain relief means comprising an O-ring element; and
the beaker-like sensor housing having a ring groove on an opening side of the introduction region for receiving and maintaining the O-ring element therein.

19. A sensor device comprising:
a beaker-like sensor housing configured for receiving a wired sensor;
the beaker-like sensor housing having:
an end face at one terminal end thereof;
an introduction region for the wired sensor at an end opposite the one terminal end;
an orientation region for the wired sensor which is adjacent to the introduction region, and which has a contour shaped in accordance with a cross-sectional contour of the wired sensor to orientate the wired sensor in a desired orientation within the orientation region; and
a placement region adjacent to the orientation region for the wired sensor, the placement region being adjacent to the end face of the beaker-like sensor housing;
wherein:
the orientation region has an internal cross-sectional contour which is adapted to a cross-sectional contour of the wired sensor;
the wired sensor in the beaker-like sensor housing is introduced into a curable material in its placement region; and
the curable material is cured to embed the wired sensor in the placement region; and
a strain relief means for a wired cable portion of the wired sensor;
the strain relief means comprising an O-ring element; and
the beaker-like sensor housing having a ring groove on an opening side of the introduction region for receiving and maintaining the O-ring element therein.

* * * * *